(12) United States Patent
Kiest, Jr. et al.

(10) Patent No.: US 6,837,486 B1
(45) Date of Patent: Jan. 4, 2005

(54) METHOD FOR FEEDING CABLE INTO A PIPE

(75) Inventors: Larry W. Kiest, Jr., Ottawa, IL (US); Victor F. Schuh, Lodi, CA (US); Eric G. Vanderlans, Lobi, CA (US); Stephen L. Thomas, Lodi, CA (US); Rick A. Fast, LaSalle, IL (US)

(73) Assignee: LMK Enterprises, Inc., Ottawa, IL (US)

( * ) Notice: Subject to any disclaimer, the term of this patent is extended or adjusted under 35 U.S.C. 154(b) by 0 days.

(21) Appl. No.: 10/369,283

(22) Filed: Feb. 19, 2003

(51) Int. Cl.[7] .............................................. B65H 59/00
(52) U.S. Cl. ......................... 254/134.3 FT; 254/134.4
(58) Field of Search ............................. 254/134.3 FT, 254/134.3 R, 134.4

(56) References Cited

U.S. PATENT DOCUMENTS

| | | | | |
|---|---|---|---|---|
| 2,286,781 A | * | 6/1942 | Abramson et al. | 254/134.3 FT |
| 4,202,530 A | * | 5/1980 | Conti | 254/134.3 FT |
| 6,109,595 A | * | 8/2000 | Lecours | 254/134.3 FT |

* cited by examiner

Primary Examiner—Robert C. Watson
(74) Attorney, Agent, or Firm—McKee, Voorhees & Sease, PLLC

(57) ABSTRACT

A frame assembly includes a shoe frame and a roller frame. The shoe frame includes an inflatable bladder thereon and the roller frame includes at least one roller that is rotatably mounted thereto. The method of the present invention comprises placing the shoe within a pipe and inflating the bladder so as to secure the shoe frame within the pipe. A flexible cable is then trained around the roller and into the flexible pipe.

13 Claims, 3 Drawing Sheets

METHOD FOR FEEDING CABLE INTO A PIPE

BACKGROUND OF THE INVENTION

The present invention relates to a method and apparatus for feeding cable into a pipe.

It is often desirable to feed elongated flexible cables into sewer pipes. These cables may be video cables, hoses used for equipment repairing the pipeline, electric cables for powering repair devices within the pipeline, or other flexible cables.

These cables are usually fed downwardly into a manhole and then horizontally into a sewer pipe which communicates with the bottom of the manhole. Often the ends of the sewer pipe have sharp edges, and many of these cables can be damaged by scraping against the sharp edges of the end of the sewer pipe.

Accordingly rollers have been made available for guiding the cables away from the ends of the sewer pipe when the cables are being fed into the sewer pipe. These devices usually include a shoe which fits within the sewer pipe, and a plurality of rollers that are outside the sewer pipe. The cable is trained around the rollers and then into the sewer pipe.

Existing shoes are typically made of steel or aluminum. The front toe of the shoe is inserted into the sewer pipe. Poles are attached to the top of the shoe and the opposite ends of the poles are hung onto the top of the manhole or the adjacent pavement. The cable is guided around the rollers from a horizontal position within the pipe to a vertical position extending upwardly out of the manhole. Usually several rollers are utilized to maintain a gradual radius during the bend. Furthermore the shoe is designed to protect the cable or hose from contacting the edge of the pipe so as to avoid the sharp edges of the pipe.

During pipeline maintenance or rehabilitation of the pipelines cables and/or hoses are strung through the pipe for many reasons, including cleaning, video inspection, robot tools and insertion of pipelining materials. During these maintenance procedures the cables and hoses are winched with a high tension and it is crucial that the bottom roller shoe does not kick out of the pipe or become dislodged in any way. If the shoe moves sideways or is kicked completely out of the pipe the cables and hoses will be damaged, costing typically thousands of dollars for replacement.

As used herein the term cable includes any type of hose, cable, electric cord, or other elongated flexible member which is fed into a pipe.

Therefore a primary object to the present invention is the provision of an improved method and apparatus for feeding cable into a pipe.

A further object of the present invention is the provision of apparatus which can be affixed tightly within the sewer pipe during use so that it will not become dislodged.

A further object of the present invention is the provision is an approved apparatus for feeding cable into a pipe which has a bladder which can be inflated to tightly secure the apparatus within the end of the sewer pipe.

A further object of the present invention is the provision of a method and apparatus for feeding cable into a pipe which includes a detachable member that can be replaced with other detachable members sized to fit within sewer pipes of different dimensions.

A further object of the present invention is the provision of an improved apparatus for feeding cable into a pipe which permits the cable to be tensioned, but which maintains the cable free from contact with the sharp ends of the sewer pipe.

A further object of the present invention is the provision of an improved apparatus for feeding cable into a pipe which includes a plurality of rollers that maintain a gradual radius during the bend of the cable from a horizontal position within the pipe to a vertical direction.

A further object of the present invention is the provision of an apparatus that can be inserted into the sewer pipe and attached to the sewer pipe without the need of a person descending into a manhole.

A further object of the present invention is the provision of an improved method and apparatus for feeding cable into a pipe which is economical to manufacture, durable in use, and efficient in operation.

BRIEF SUMMARY OF THE INVENTION

The foregoing objects may be achieved by an apparatus for feeding an elongated flexible cable into a pipe. The apparatus includes a shoe frame and a roller frame connected to one another. A bladder on the shoe frame is capable of being inflated from a deflated condition to an inflated condition. A fluid conduit is connected to the bladder for introducing fluid under pressure to inflate the bladder from the deflated condition to the inflated condition. At least a first roller is mounted on the roller frame.

According to one feature of the present invention a first section of the shoe frame is removable and a second section of shoe frame is capable of detachable attachment to the shoe frame for replacing the first section. Sections of different sizes and shapes maybe utilized to accommodate sewer pipes of different dimensions.

The method of the present invention comprises taking the frame assembly and inserting the shoe frame into the pipe passageway through the pipe end to an inserted position wherein the shoe frame is at least partially within the pipe passageway and the roller frame and the roller are positioned outside the pipe. The bladder is inflated to its inflated condition whereby the shoe frame and the bladder retentively engage the pipe walls and hold the shoe frame and the roller frame against movement within the pipe. A flexible cable is then fed around the roller and into the passageway whereby the flexible cable has a first segment on one side of the roller and outside the pipe passageway and a second segment on the opposite side of the roller within the pipe passageway.

When different sizes of sewer pipe are encountered, the shoe frame includes a first removable section. The method comprises removing the first removable section and replacing it with a second removable section having a second size that fits the cross-sectional size of the pipe passageway.

According to another feature of the invention the method comprises positioning the roller so that it prevents the flexible cable from coming in contact with a pipe end.

DETAILED DESCRIPTION OF THE PREFERRED EMBODIMENT

Figure 1:
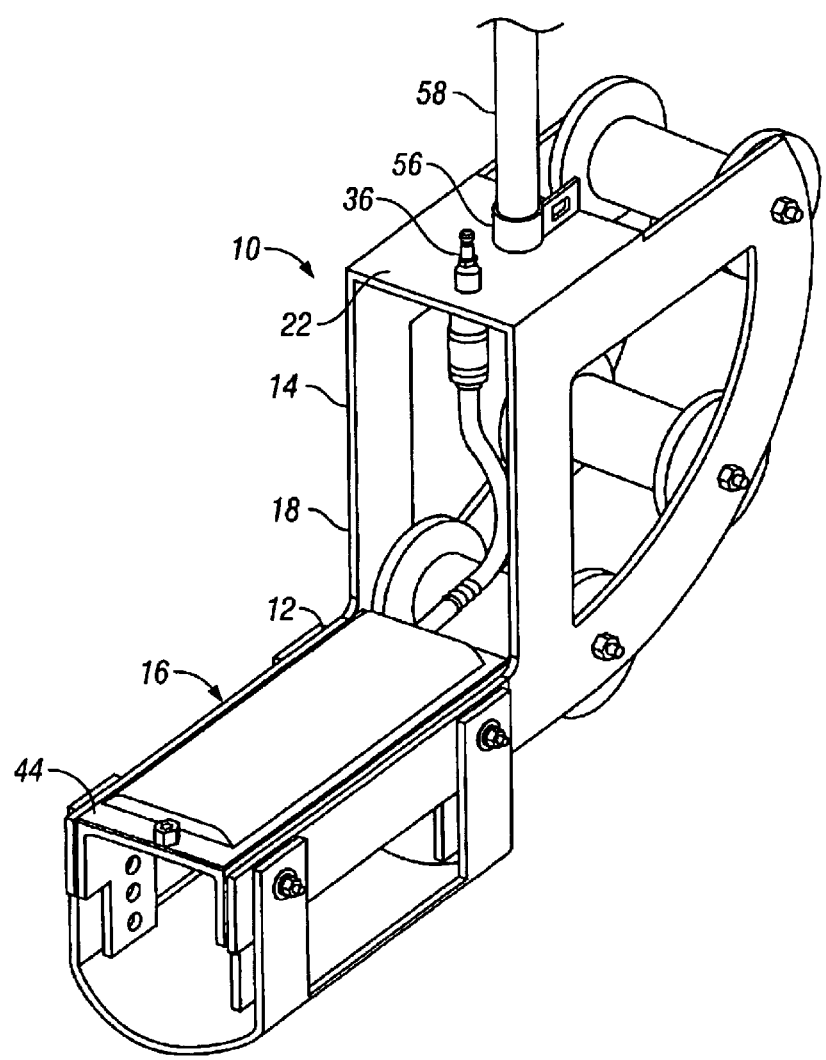
FIG. 1 is a perspective view of the apparatus of the present invention.

Referring to the drawings the numeral 10 generally designates the apparatus of the present invention. Apparatus 10 includes a frame assembly 12 which is comprised of a shoe frame 14 and a roller frame 16. The roller frame 16 includes a first roller frame side 18 and a second roller frame side 20, both of which are identical in construction. The roller frame sides 18, 20 are connected at their upper ends by a horizontal web 22. Each of the roller frame sides 18, 20 includes a horizontally extending member 24, a vertically extending member 26, and a curved member 28. Extending from the lower end of the curved member 28 is a horizontal connecting member 30. Three rollers 32 are positioned along the curved member 28 and are rotatably mounted between the two roller frames 18 and 20 for pivotable movement about three roller axes 34. A fluid nipple 36 is mounted on the web 22 and includes a fluid hose 38 connected thereto. The lower end of nipple 36 is connected to a fluid conduit 40.

Figure 2:
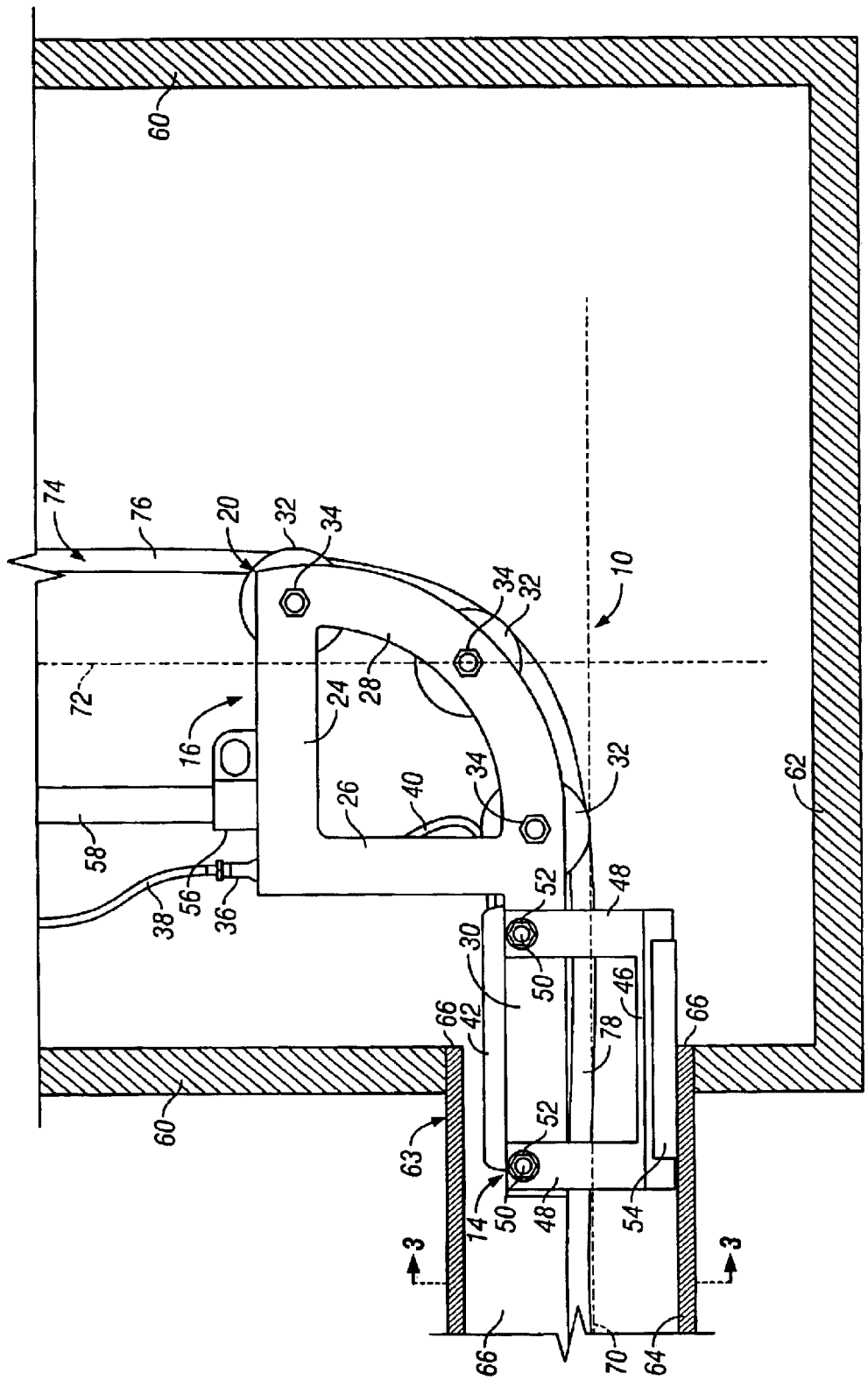
FIG. 2 is a sectional view of a sewer pipe and manhole, showing the apparatus of the present invention in place with the shoe frame within the sewer pipe.
Figure 3:
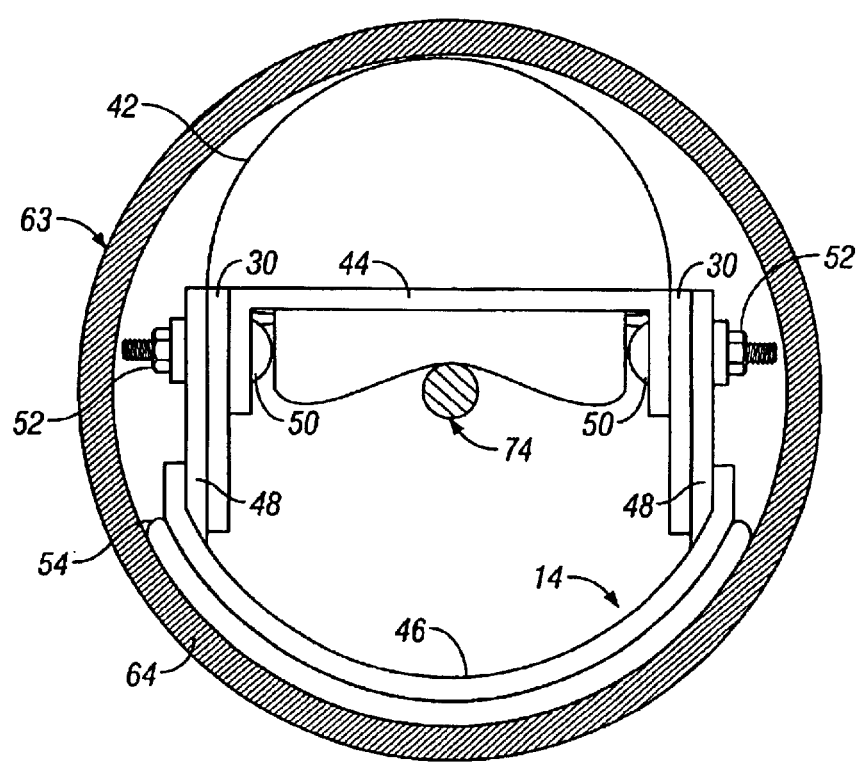
FIG. 3 is a sectional view taken along line 3—3 of FIG. 2.

The shoe frame 14 includes a bladder 42 which is inflatable from the deflated position shown in FIG. 2 to the inflated position shown in FIG. 3. The bladder is mounted on a bladder support plate 44. A curved plate 46 includes upstanding legs 48 which are attached to the horizontal connecting members 30 of the roller frame 16. Bolts 50 and nuts 52 make this connection. The bottom surface of the curved plate 46 is covered by a rubber layer 54 which provides a protective surface for the curved plate 46. While rubber is the preferred material for use for layer 54, other materials maybe used so long as they are softer than the curved plate 46.

Extending upwardly from the web 22 is a socket 56 which has threaded therein a vertical pole 58.

Referring to FIG. 2 a manhole includes manhole walls 60 and a manhole bottom 62. A sewer pipe 63 includes a sewer pipe wall 64 and a sewer pipe end 66. Often the end 66 of the sewer pipe is jagged or sharp and it is important to protect cables that are inserted into the sewer pipe from contacting or scraping against this sharp edge. The sewer pipe 63 includes a sewer pipe passageway 68 having an elongated sewer pipe axis 70. The manhole includes a vertical manhole axis 72.

A flexible cable 74 is shown having a first cable segment 76 above the rollers 32 and a second cable section 78 horizontally extending into the sewer pipe 63.

In operation, the threaded pipe 58 is used to lower the apparatus 10 into a manhole and to place the shoe frame 14 inside the sewer pipe 63 as shown in FIG. 2. Then pressurized fluid is introduced to the bladder 42 through the hose 38, the nipple 36 and the conduit 40. This causes the bladder 42 to inflate to the position shown from its deflated position shown in FIG. 2 to its inflated position shown in FIG. 3. As can be seen in FIG. 3, the bladder 42 tightly embraces the upper portion of the sewer pipe 63. At the opposite side of the shoe frame 14 the curved plate 46 and the rubber layer 54 are pressed against the walls 64 of the sewer pipe 63. This tightly places the shoe frame 14 and the roller frame 16 in position with the shoe frame 14 located within the sewer pipe 63.

Next the cable 74 is trained around the rollers 32 in the manner shown in FIG. 2. In this position the horizontal portion 78 of the cable 74 is within the sewer pipe 63 and the upstanding portion 76 of the cable 74 is on the opposite sides of the rollers and extends upwardly within the manhole.

Often, tension must be placed on the cable or hose 74. During this tension, a considerable amount of stress is placed upon the roller assembly 10. However, because the bladder 42 is expanding to tightly hold the shoe frame 14 within the sewer pipe 63, the tension in the cable 74 does not dislodge or move the apparatus 10. It should be noted that the rollers 32 provide a smooth bending of the cable 74 from its vertical section 76 to its horizontal section 78. Furthermore, the rollers 32 hold the cable 74 away from the sharp edges the ends 66 of the pipe 64.

Different sizes of sewer pipe 63 may be encountered. In order to accommodate these various sizes, the bolts and nuts 50, 52 may be removed and the legs 48 and the curved plate 46 removed from the shoe frame 14. In order to accommodate a larger diameter pipe 63 a second curved plate 46 is provided with legs 48 that are longer. This second plate may then be bolted in place on the shoe frame so as to accommodate a pipe 63 of larger diameter. Similarly a pipe 63 of smaller diameter can be accommodated by using a curved plate 46 having shorter legs 48. It is also possible to vary the curvature of the curved plate 46 to accommodate sewer pipes of differing diameters.

While three rollers 32 are shown, it is possible to use fewer than three or more than three without detracting from the invention. It is also possible to use inflating fluid for the bladder 42 that is either liquid or gas.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for feeding an elongated flexible cable into a pipe having a pipe end and a pipe wall defining an elongated pipe passageway having a passageway longitudinal axis, the method comprising:

taking a frame assembly comprising a shoe frame connected to a roller frame, the shoe frame having an inflatable bladder capable of being inflated from a collapsed condition to an inflated condition, the shoe frame being sized to fit loosely within the pipe passageway when the bladder is in the collapsed condition and to be tightly retentively held within the pipe passageway when the bladder is in the inflated condition, the roller frame having a roller mounted thereon for rotation about a roller axis;

inserting the shoe frame into the pipe passageway through the pipe end to an inserted position wherein the shoe frame is at least partially within the pipe passageway and the roller frame and the roller are positioned outside the pipe;

inflating the bladder to the inflated condition whereby the shoe frame and the bladder retentively engage the pipe walls and hold the shoe frame and the roller frame against movement relative to the pipe;

feeding the elongated flexible cable around the roller and into the passageway whereby the flexible cable has a first segment on one side of the roller and outside the pipe passageway, and a second cable segment on the opposite side of the roller within the pipe passageway;

the shoe frame including a first removable section having a first size;

removing the first removable section when the first size does not fit a cross sectional size of the pipe passageway; and replacing the first removable section with a second removable section having a second size that fits the cross sectional size of the pipe passageway.

2. A method according to claim 1 wherein a plurality of rollers are mounted for rotation to the roller frame, the method comprising feeding the flexible cable around all of the rollers whereby the first segment of the flexible cable is on one side of all the rollers and outside the pipe passageway and the second segment of the flexible cable is on the opposite side of all the rollers and within the pipe passageway.

3. A method according to claim 1 and further comprising positioning the roller so that it prevents the flexible cable from coming in contact with the pipe end.

4. A method according to claim 3 and further comprising extending the first segment of the flexible cable in a direction different from the longitudinal axis of the pipe passageway.

5. A method according to claim 4 and further comprising placing tension on the first and second segments of the flexible cable.

6. A method for feeding an elongated flexible cable into a manhole having a manhole wall and a vertical manhole axis, a pipe in communication with the manhole wall having a pipe end and a pipe wall defining an elongated pipe passageway having a passageway longitudinal axis, the method comprising:

taking a frame assembly comprising a shoe frame connected to a roller frame, the shoe frame having an inflatable bladder capable of being inflated from a collapsed condition to an inflated condition, the shoe frame being sized to fit loosely within the pipe passageway when the bladder is in the collapsed condition and to be tightly retentively held within the pipe passageway when the bladder is in the inflated condition, the roller frame having a roller mounted thereon for rotation about a roller axis;

inserting the frame assembly into the manhole to a position adjacent the pipe passageway;

inserting the shoe frame into the pipe passageway through the pipe end to an inserted position wherein the shoe frame is at least partially within the pipe passageway and the roller frame and the roller are positioned outside the pipe;

inflating the bladder to the inflated condition whereby the shoe frame and the bladder retentively engage the pipe walls and hold the shoe frame and the roller frame against movement relative to the pipe;

feeding the elongated flexible cable around the roller and into the passageway whereby the flexible cable has a first segment on one side of the roller and outside the pipe passageway, and a second cable segment on the opposite side of the roller within the pipe passageway.

7. A method according to claim 6 and further comprising extending the first segment of the flexible cable in a direction different from the longitudinal axis of the pipe passageway.

8. A method according to claim 7 and further comprising placing tension on the first and second segments of the flexible cable.

9. A method for feeding an elongated flexible cable into a pipe having a pipe end and a pipe wall defining an elongated pipe passageway having a passageway longitudinal axis, the method comprising:

taking a frame assembly comprising a shoe frame connected to a roller frame, the shoe frame having an inflatable bladder capable of being inflated from a collapsed condition to an inflated condition, the shoe frame being sized to fit loosely within the pipe passageway when the bladder is in the collapsed condition and to be tightly retentively held within the pipe passageway when the bladder is in the inflated condition, the roller frame having a roller mounted thereon for rotation about a roller axis;

inserting the shoe frame into the pipe passageway through the pipe end to an inserted position wherein the shoe frame is at least partially within the pipe passageway and the roller frame and the roller are positioned outside the pipe;

inflating the bladder to the inflated condition whereby the shoe frame and the bladder retentively engage the pipe walls and hold the shoe frame and the roller frame against movement relative to the pipe;

feeding the elongated flexible cable around the roller and into the passageway whereby the flexible cable has a first segment on one side of the roller and outside the pipe passageway, and a second cable segment on the opposite side of the roller within the pipe passageway;

the shoe frame including a first removable section curved at a first arch of curvature;

removing the first removable section when the first size does not fit a curvature of the pipe passageway; and replacing the first removable section with a second removable section having a second arch of curvature that fits the curvature of the pipe passageway.

10. A method according to claim 9 wherein a plurality of rollers are mounted for rotation to the roller frame, the method comprising feeding the flexible cable around all of the rollers whereby the first segment of the flexible cable is on one side of all the rollers and outside the pipe passageway and the second segment of the flexible cable is on the opposite side of all the rollers and within the pipe passageway.

11. A method according to claim 9 and further comprising positioning the roller so that it prevents the flexible cable from coming in contact with the pipe end.

12. A method according to claim 11 and further comprising extending the first segment of the flexible cable in a direction different from the longitudinal axis of the pipe passageway.

13. A method according to claim 12 and further comprising placing tension on the first and second segments of the flexible cable.

* * * * *